G. G. WOLFE.
Reservoir Cooking-Stoves.
No. 6,219. Reissued Jan. 12, 1875.
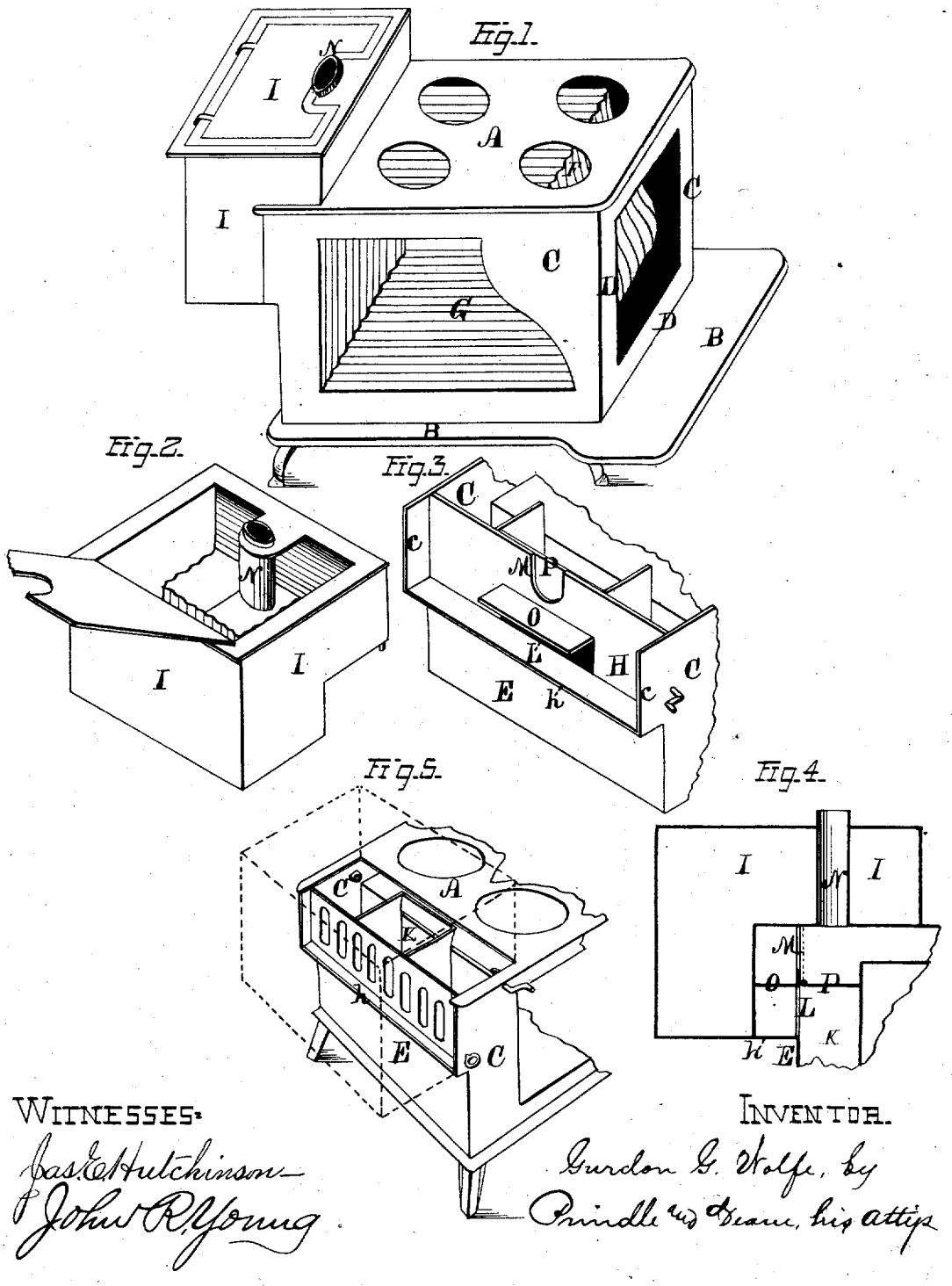
WITNESSES:
Jas. E. Hutchinson
John R. Young
INVENTOR.
Gordon G. Wolfe, by
Prindle and Deane, his attys
THE GRAPHIC CO. PHOTO-LITH. 39 & 41 PARK PLACE, N.Y.

UNITED STATES PATENT OFFICE.

GURDON G. WOLFE, OF TROY, NEW YORK.

IMPROVEMENT IN RESERVOIR COOKING-STOVES.

Specification forming part of Letters Patent No. 76,292, dated March 31, 1868; reissue No. 5,442, dated June 10, 1873; reissue No. 6,219, dated January 12, 1875; application filed January 28, 1874.

DIVISION C.

*To all whom it may concern:*

Be it known that I, GURDON G. WOLFE, of the city of Troy, in the county of Rensselaer and State of New York, did invent certain new and useful Improvements in Cooking-Stoves, for which Letters Patent No. 76,292 were issued to me upon the 31st day of March, 1868, and thereafter duly surrendered and reissued, bearing date of June 10, 1873, and numbered 5,442, which reissued Letters Patent have been found defective in that the specification and claims do not cover and embrace all of the original invention, as shown in the drawings filed in the Patent Office upon the 14th day of February, 1868.

Now, therefore, being desirous of reissuing said reissued Letters Patent, herewith surrendered, I have prepared, and do hereby declare that the following is, a full, clear, and exact description of the said invention, reference being had to the accompanying drawing making a part of this specification, in which—

Figure 1 is a perspective view of my cooking-stove and water-reservoir as constructed and combined. Fig. 2 is a like view of said reservoir detached from said stove. Fig. 3 is a perspective view of the rear end of said stove, the reservoir being removed. Fig. 4 is a vertical central section of said stove and reservoir upon a line extending from front to rear. Fig. 5 is a perspective view of the rear end of said stove, the reservoir being removed and a different construction of said end shown.

Letters of like name and kind refer to like parts in each figure.

My invention has for its object the rapid and economical heating of water within a reservoir attached to or upon the rear end of a cooking-stove; and it consists, principally, in a chamber extending between the rear casing of the ascending flue of a cooking-stove and the front side of a water-reservoir attached thereto, and communicating at its lower side with said ascending flue, and at its upper side with the exit-flue, in combination with a damper, by means of which the upper part of the said ascending flue may be caused to communicate directly with or be separated from said exit-flue, substantially as and for the purpose hereinafter specified.

It consists, further, in a chamber situated between the rear side of the descending and ascending flues of a cooking-stove and the front side of a water-reservoir, partially divided by a central horizontal flue-strip, and communicating at its lower side with the ascending flue and at its upper side with the exit-flue, substantially as and for the purpose hereinafter shown.

It consists, finally, in combining with a chamber situated between the rear side of the vertical flues of a cooking-stove and the front side of a water-reservoir attached thereto, partially divided by a horizontal flue-strip, and communicating through suitable openings with the center or ascending flue and the exit-flue, a damper for closing the upper portion of said flue, substantially as and for the purpose hereinafter set forth.

In the annexed drawing, A represents the top plate, B the bottom plate, C and C the side plates, D the front plate, and E the rear plate, of a cooking-stove provided with a fuel-chamber, F, oven G, and the usual system of flues. At the rear end of the stove the side plates, C and C, project rearward beyond the end plate, E, and in connection with a horizontal flange, *h*, that extends between the lower ends of such projecting portions *c* and *c*, form a recess or chamber, H, that is open at its rear, and extends from the upper side of said stove downward to a point, preferably, near the vertical center of the same. Against the rear open side of the chamber H is placed a reservoir, I, the front side of which incloses said open space, and cuts off communication between said chamber and the outer air. Communication between the lower side of said chamber and the center flue, K, is effected by means of an opening, L, which passes inward through the end plate, E, while a second opening, M, at the upper side of said chamber, furnishes communication between the same and the exit-flue N. Immediately above the opening L is placed a horizontal flue-strip, O, which extends from front to rear, between the end plate, E, and reservoir I, and laterally corresponds in dimensions to the length of said opening. A damper, P, pivoted within the rear side of the center flue, directly opposite to said flue-strip O, is arranged to close said flue when turned to a horizontal position, as shown by the full lines in Fig. 4, and to open said flue and close the opening M when turned upward, as shown by the dotted lines of said figure.

The device is now complete, and operates as follows: When the damper P is adjusted to a horizontal position, so as to close the upper end of the center flue, K, the heated escaping products of combustion passing upward through the same are caused to enter the chamber H through the opening L, and impinge against the lower side of the plate O, which plate, operating as a deflector, causes the current to divide and pass laterally outward in each direction around its ends, after which said gases turn inward, and, uniting once more, pass through the opening M into the exit-flue N, having during such passage given off a large percentage of their surplus heat to the contents of the reservoir.

When but little heat is required for the reservoir the damper P is turned upward, so as to open the upper end of the ascending flue K and close the opening M between the exit-flue N and the chamber H, when the latter becomes practically a dead-air space, which receives heat principally through the rear plate, E, and in a small degree from the expansion of the heated gases from said flue through the lower opening, L, the degree of heat thus obtained, however, being sufficient to maintain the required temperature of the liquid contents of said reservoir.

The construction described furnishes a simple, efficient, and convenient means whereby water within a reservoir may be rapidly or less quickly heated, as is desired.

Having thus fully set forth the nature and merits of my invention, what I claim as new is—

1. A chamber extending between the rear casing of the ascending flue of a cooking-stove and the front side of a water-reservoir attached thereto, and communicating at its lower side with said ascending flue, and its upper side with the exit-flue, in combination with a damper by means of which the upper part of the said ascending flue may be caused to communicate directly with or be separated from said exit-flue, substantially as and for the purpose specified.

2. A chamber situated between the rear side of the descending and ascending flues of a cooking-stove and the front side of a water-reservoir attached thereto, partially divided by a central horizontal flue-strip, and communicating at its lower side with the ascending flue, and at its upper side with the exit-flue, substantially as and for the purpose shown.

3. In combination with a chamber situated between the rear side of the vertical flues of a cooking-stove and the front side of a water-reservoir attached thereto, partially divided by a horizontal flue-strip, and communicating through a suitable opening at its lower side with the center or ascending flue, and through a similar opening at its upper side with the exit-flue, a damper for closing the upper portion of said ascending flue, substantially as and for the purpose set forth.

In testimony whereof I have hereunto set my hand this 24th day of January, 1874.

GURDON G. WOLFE.

Witnesses:
WILLIAM TOUGH,
NELSON PRAMER.